(12) United States Patent
Ratnam et al.

(10) Patent No.: US 8,040,790 B2
(45) Date of Patent: Oct. 18, 2011

(54) LOW COMPLEXITY BANDWIDTH EFFICIENT CARRIER FREQUENCY OFFSET ESTIMATION TECHNIQUE FOR OFDMA UPLINK TRANSMISSIONS

(75) Inventors: Varada Raja Kumar Ratnam, Kharagpur (IN); Sameer Saheerudeen Mohammed, Kharagpur (IN)

(73) Assignee: Indian Institute of Technology, West Bengal (IN)

( * ) Notice: Subject to any disclaimer, the term of this patent is extended or adjusted under 35 U.S.C. 154(b) by 67 days.

(21) Appl. No.: 12/550,087

(22) Filed: Aug. 28, 2009

(65) Prior Publication Data

US 2010/0080114 A1   Apr. 1, 2010

(30) Foreign Application Priority Data

Aug. 29, 2008   (IN) .......................... 1503/KOL/2008

(51) Int. Cl.
*H04J 11/00* (2006.01)
*H04W 4/00* (2009.01)
*H04B 7/208* (2006.01)
*H04L 27/28* (2006.01)

(52) U.S. Cl. ........ 370/208; 370/330; 370/344; 375/260; 375/344

(58) Field of Classification Search .................. 370/208, 370/210, 329, 335, 342, 343, 330, 344, 468; 375/260, 267, 344
See application file for complete search history.

(56) References Cited

U.S. PATENT DOCUMENTS

| | | | |
|---|---|---|---|
| 6,628,926 B1 * | 9/2003 | van de Beek et al. ........... 455/75 |
| 7,068,593 B2 * | 6/2006 | Cho et al. ...................... 370/208 |
| 7,103,332 B2 * | 9/2006 | Choi et al. ................. 455/192.2 |
| 7,324,435 B2 * | 1/2008 | Ma ............................... 370/208 |
| 7,675,989 B2 * | 3/2010 | Ahn et al. ..................... 375/267 |
| 7,693,039 B2 * | 4/2010 | Roh et al. ...................... 370/208 |
| 7,742,392 B2 * | 6/2010 | Ge et al. ........................ 370/208 |
| 2003/0058966 A1 * | 3/2003 | Gilbert et al. ................. 375/326 |
| 2004/0131011 A1 * | 7/2004 | Sandell et al. ................ 370/210 |
| 2006/0133260 A1 * | 6/2006 | Kim et al. ..................... 370/208 |
| 2008/0317149 A1 * | 12/2008 | Sondur et al. ................ 375/260 |

OTHER PUBLICATIONS

Morelli et al., "An improved frequency offset estimator for OFDM applications," *IEEE Communications Letters* (1999) 3 (3): 75-77.
Ma et al., "Non-data-aided carrier offset estimators for OFDM with null subcarriers: Identifiability, algorithms, and performance," *IEEE Journal on Selected Areas in Communications* (2001) 19 (12): 2504-2515.
Huang et al., "Carrier frequency offset estimation for OFDM systems using null subcarriers," *IEEE Transactions on Communications* (2006) 54 (5): 813-823.

(Continued)

*Primary Examiner* — Kwang B Yao
*Assistant Examiner* — Candal Elpenord
(74) *Attorney, Agent, or Firm* — Merchant & Gould P.C.

(57) ABSTRACT

A system and a method for estimating low complexity bandwidth efficient carrier frequency offset for orthogonal frequency division multiple access (OFDMA) and or single carrier frequency division multiple access (SC-FDMA) uplink transmissions in a communication network systems including a group of subscriber stations, a base station including carrier frequency offset unit. The method steps include transmitting a plurality of null subcarrier signals and data subcarrier signals from plurality of said subscriber stations (SS) to the base station; processing transmitted subcarrier signals at the base station by estimating carrier frequency offset (CFO) by carrier frequency offset unit; selecting the subcarrier signals based on carrier assignment scheme (CAS).

6 Claims, 9 Drawing Sheets

OTHER PUBLICATIONS

Barbarossa et al., "Channel-independent synchronization of orthogonal frequency division multiple access systems," *IEEE Journal on Selected Areas in Communications* (2002) 20 (2): 474-486.

van de Beek et al., "A time and frequency synchronization scheme for multiuser OFDM," *IEEE Journal on Selected Areas in Communications* (1999) 17 (11): 1900-1914.

Cao et al., "Deterministic multiuser carrier-frequency offset estimation for interleaved OFDMA uplink," *IEEE Transactions on Communications* (2004) 52 (9): 1585-1594.

Morelli, M., "Timing and frequency synchronization for the uplink of an OFDMA system," *IEEE Transactions on Communications* (2004) 52 (2): 296-306.

Pun et al., "Maximum-likelihood synchronization and channel estimation for OFDMA uplink transmissions," *IEEE Transactions on Communications* (2006) 54 (4): 726-736.

Pun et al., "Iterative detection and frequency synchronization for OFDMA uplink transmissions," *IEEE Transactions on Wireless Communications* (2007) 6 (2): 629-639.

Morelli et al., "Synchronization techniques for orthogonal frequency division multiple access (OFDMA): A tutorial review," *Proceedings of the IEEE* (2007) 95 (7): 1394-1427.

Schmidl et al., "Robust frequency and timing synchronization for OFDM," *IEEE Transactions on Communications* (1997) 45 (12): 1613-1621.

\* cited by examiner

Subband CAS

Interleaved CAS

Generalized CAS

User 1   User 2   User 3   User 4

LOW COMPLEXITY BANDWIDTH EFFICIENT CARRIER FREQUENCY OFFSET ESTIMATION TECHNIQUE FOR OFDMA UPLINK TRANSMISSIONS

TECHNICAL FIELD OF THE INVENTION

The present invention relates to a system and a method for estimating low complexity bandwidth efficient carrier frequency offset for orthogonal frequency division multiple access (OFDMA) and or single carrier frequency division multiple access (SC-FDMA) uplink transmissions in communication systems.

BACKGROUND AND THE PRIOR ART

Orthogonal Frequency Division Multiplexing (OFDM), the underlying technique behind OFDMA, is a multicarrier communication system which converts a high data rate stream into a group of parallel low data rate streams which transform the frequency selective fading situation being encountered in a wireless channel to tractable flat fading scenario. OFDMA has gained acceptance recently as an important multiple access technique to provide OFDM services to a group of subscribers simultaneously. The downlink of an OFDMA communication system is nearly equivalent to that of an OFDM system and it is characterized by a single carrier frequency offset (CFO) which can be easily estimated using conventional estimation techniques available for OFDM. The CFO estimation problem in the uplink transmission of OFDMA is more challenging than the downlink. In the uplink transmission of OFDMA each active subscriber station (SS) may have a different CFO relative to the common base station (BS) receiver which, if uncompensated, would result in self and multiple access interferences and thereby poor bit error rate (BER) performances.

The first step of OFDMA synchronization takes place in the downlink transmission where the subscriber stations SSs or mobile terminals (MTs) estimate the timing and frequency offsets using the pilot signals transmitted by the base station (BS). A major portion of the frequency offset can be estimated in this step and the CFO estimation techniques available for OFDM can be directly employed for this purpose as the user's signal appear at each SS with a common frequency error (T. M. Schmidl and D. C. Cox, "Robust frequency and timing synchronization for OFDM" IEEE Trans. Commun., vol. 45, no. 12, pp. 1613-1621, December 1997; M. Morelli and U. Mengali, "An improved frequency offset estimator for OFDM applications," IEEE Commun. Left., vol. 3 no. 3, pp. 75-77, March 1999; X. Ma, C. Tepedelenlioglu, G. B. Giannakis, and S. Barbarossa, "Non-data-aided carrier offset estimators for OFDM with null subcarriers: Identifiability, Algorithms, and Performance," IEEE J. Sel. Areas Commun., vol. 19, no. 12, pp. 2504-2511, December 2001; Defeng (David) Huang and K. B. Letaief, "Carrier frequency offset estimation for OFDM systems using null subcarriers," IEEE Trans. Commun., vol. 54, no. 5, pp. 813-822, May 2006.). The SSs use these estimates as a reference for the uplink transmission. But due to Doppler shifts and oscillator phase noise, the signals received at the BS from various SSs will have small frequency offsets within the range of +/−0.5 of subcarrier spacing. Hence the second step of OFDMA CFO estimation is done at the BS by estimating the frequency offsets between the various SSs and the BS receiver. This turns out to be a challenging multiple CFO estimation problem.

CFO estimation in the uplink OFDMA is considered as an active research topic recently and a few methods are proposed in the literature. Most of these schemes are too specific to the carrier assignment schemes (CAS) used within the OFDMA system.

The main difference between OFDM and OFDMA is that in the case of later, in the downlink, each OFDM symbol conveys distinct sets of data to multiple subscribers simultaneously. Thus the available N subcarriers are usually evenly divided among the M users, by dividing N into R subchannels, each consisting of Q=N/R subcarriers. As the maximum number of users that an OFDMA system can support is decided by R, it is assumed that M≦R. Since the carriers allocated to the M users are to be distinct, $I_k \cap I_j = \emptyset$ for $k \neq j$, where $I_k$ and $I_j$ are the sets of sub carriers allocated to $k^{th}$ and $j^{th}$ users respectively. During the uplink transmission M users transmit independently, using the sub-carriers allocated to them by padding zeroes in rest of the sub-carrier locations.

The three CAS proposed for OFDMA are subband CAS, generalized CAS and interleaved CAS.

A timing and frequency offset estimation scheme for OFDMA with subband CAS is proposed in (J. J. van de Beek, P. O. BAorjesson, M. L. Boucheret, D. LandstrAom, J. M. Arenas, O. A Odling, C. A Ostberg, M. Wahlqvist, and S. K. Wilson, "A time and frequency synchronization scheme for multiuser OFDM," IEEE J. Sel. Areas Commun., vol. 17, no. 11, pp. 1900-1914, November 1999.) Here the subbands of each user are filtered first and estimation is done by using the cyclic prefix (CP) associated with each user's data. But the estimator performance deteriorates when the number of subcarriers in a subband becomes smaller due to the high correlation of samples. A CFO estimation scheme for the quasi-synchronous (where the CP duration is greater than two way propagation delay and channel delay spread) subband CAS OFDMA is proposed in (S. Barbarossa, M. Pompili, and G. B. Giannakis, "Channel-independent synchronization of orthogonal frequency division multiple access systems," IEEE J. Sel. Areas Commun., vol. 20, no. 2, pp. 474-486, February 2002) This technique uses the virtual subcarriers employed in each subband and estimates the CFO by means of the energy minimization at the DFT output as done in (X. Ma, C. Tepedelenlioglu, G. B. Giannakis, and S. Barbarossa, "Non-data-aided carrier offset estimators for OFDM with null subcarriers: Identifiability, Algorithms, and Performance," IEEE J. Sel. Areas Commun., vol. 19, no. 12, pp. 2504-2511, December 2001.)

A CFO estimation scheme for the quasi-synchronous interleaved OFDMA, which exploits the inherent periodic structure of this type of OFDMA symbol, is proposed in (Z. Cao, U. Tureli, and Y. D. Yao, "Deterministic multiuser carrier-frequency offset estimation for interleaved OFDMA uplink," IEEE Trans. Commun., vol. 52, no. 9, pp. 1585-1594, September 2004). The accuracy of the method decreases when the number of users approaches the number of available subcarriers.

A maximum likelihood (ML) technique for the timing and frequency offset estimation in OFDMA system with a generalized CAS is proposed in (M. Morelli, "Timing and frequency synchronization for the uplink of an OFDMA system," IEEE Trans. Commun, vol. 52, no. 2, pp. 296-306, February 2004). But it has a serious limitation as it assumes that all other users in the system are already synchronized perfectly. Modified forms of this method for quasi-synchronous scenarios are proposed in (M. O. Pun, M. Morelli, and C-C. J. Kuo, "Maximum-likelihood synchronization and channel estimation for OFDMA uplink transmissions," IEEE Trans. Commun. Vol. 54, no. 4, pp. 726-736, April 2006; M. O. Pun, M. Morelli, and C-C. J. Kuo, "Iterative detection and frequency synchronization for OFDMA uplink transmissions," IEEE Trans. Signal Proc., vol. 6, no. 2, pp. 629-639, February 2007), where timing and frequency offsets are estimated from the training blocks being transmitted by each user at the start of the uplink frame. This results in considerable wastage of bandwidth. Moreover, the computational complexity of (M. O. Pun et al, 2006) is very high. An overview of OFDMA and its synchronization techniques are presented in (M. Morelli, C-C. J. Kuo, and M. O. Pun, "Synchronization Techniques for Orthoganal Frequency Division Multiple Access (OFDMA): A Tutorial Review," Proc. IEEE, vol. 95, no. 7, pp. 1394-1427, July 2007).

A pictorial representation of the three CAS schemes are shown in FIG. 3 for N=16 and Q=R=4. Here each color represents the subcarriers allocated to a specific user and each small rectangle represents one subcarrier.

All the CFO estimation schemes proposed for OFDMA, are carrier assignment scheme (CAS) specific. This introduces considerable in convenience in system design and bandwidth assignment.

In view of the growing popularity, efficient techniques for the CFO estimation with excellent performances are still needed for practical OFDMA system implementations. The present invention proposed a null sub carrier based CFO estimation technique for OFDMA which can be applied to subband CAS, generalized CAS and a modified form of interleaved CAS. Being a null sub carrier based estimator, the proposed CFO estimation scheme does not require the knowledge of fading channel coefficients for deriving the frequency offset estimates. A null sub carrier based CFO estimator where the estimation is done by minimizing a cost function which compute the total energy present in null sub carrier locations due to the CFO. The computational complexity and training overhead of the present invention method are much lower as compared to some of the CFO estimation schemes available in the literature for OFDMA transmissions.

OBJECTS OF THE INVENTION

Accordingly one object of the present invention is to overcome the disadvantages/problems of the prior art.

Another object of the present invention is to provide a system for estimating low complexity bandwidth efficient carrier frequency offset for orthogonal frequency division multiple access (OFDMA) and or single carrier frequency division multiple access (SC-FDMA) uplink transmissions in communication systems.

Another object of the present invention is to provide a method for estimating low complexity bandwidth efficient carrier frequency offset for orthogonal frequency division multiple access (OFDMA) and or single carrier frequency division multiple access (SC-FDMA) uplink transmissions in communication systems.

Another object of the present invention is to provide a carrier assignment scheme for OFDMA and or single carrier frequency division multiple access (SC-FDMA) system

SUMMARY OF THE INVENTION

Thus the present invention relates to a method for estimating low complexity bandwidth efficient carrier frequency offset for orthogonal frequency division multiple access (OFDMA) and or single carrier frequency division multiple access (SC-FDMA) uplink transmissions in a communication network systems comprising a group of subscriber stations, a base station including carrier frequency offset unit, said method steps comprising:

transmitting plurality of null subcarrier signals and data subcarrier signals from plurality of said subscriber stations (SS) to the base station; processing said transmitted subcarrier signals at the base station by estimating carrier frequency offset (CFO) by means carrier frequency offset unit; selecting the subcarrier signals based on carrier assignment scheme (CAS); characterized in that said step of estimating carrier frequency offset comprising: generating a trial carrier frequency offset (CFO) vector thereafter point to point multiplying said trial carrier frequency offset (CFO) vector with the received signal vector without cyclic prefix; adding total energies of substantially all signals of designated null subcarrier locations; comparing added value of energies of substantially all signals of designated null subcarrier locations with previously stored null subcarrier energy to obtain a minimum energy if any corresponding to previous iteration; storing said minimum energy value against the trial carrier frequency offset (CFO) value; repeating the process until all the trial values are over; and identifying the trial carrier frequency offset (CFO) value corresponding to the minimum energy as the estimated carrier frequency offset.

According to a preferred embodiment the transmission comprising: providing plurality of data subcarriers; allocating plurality of null subcarriers based on the carrier assignment scheme (CAS); inserting zeros in remaining subcarriers resulting a N-dimensional vector; the N-dimensional vector comprising N-point inverse fast Fourier transform (IFFT) to generate time domain samples; inserting cyclic prefix (CP); converting the plurality of transmitted signals from parallel to serial mode; synchronizing the plurality of transmitted signals from the plurality of subscriber stations (SS) through a common control signal from a base station; and combined reception of the plurality of transmitted signals at the base station.

According to a preferred embodiment the processing of signals comprising: converting the plurality of transmitted signals from serial to parallel mode; removing cyclic prefix (CP) to generate the combined N-dimensional received signal vector; estimating carrier frequency offset (CFO) for each signal; correcting the carrier frequency offset (CFO) for each signal and transforming the signal into frequency domain by using fast Fourier transform (FFT) operation and remaining signal processing like channel correction and detection.

Thus the present invention relates to a system for the low complexity bandwidth efficient carrier frequency offset estimation for orthogonal frequency division multiple access (OFDMA) and or single carrier frequency division multiple access (SC-FDMA) uplink transmissions in a communication network system comprising a group of subscriber stations, a base station including carrier frequency offset unit, said system comprising: means for transmitting plurality of null subcarrier signals and data subcarrier signals from plurality of said subscriber stations (SS) to the base station; carrier offset unit estimating carrier frequency offset (CFO) by means of processing said transmitted subcarrier signals at the base station; means for selecting the subcarrier signals based on carrier assignment scheme (CAS); characterized in that said step of estimating carrier frequency offset comprising: means for generating a trial carrier frequency offset (CFO) vector thereafter point to point multiplying the said trial carrier frequency offset (CFO) vector with the cyclic prefix removed N-dimensional received signal vector; means for adding total energies of substantially all signals of designated null subcarrier locations; means for comparing added value of energies of substantially all signals of designated null subcarrier locations with previously stored null subcarrier energy to obtain a minimum energy if any corresponding to previous iteration; means for storing said minimum energy subcarrier against the trial carrier frequency offset (CFO) value; means for repeating the process until the trial values are over; and means for identifying the trial carrier frequency offset (CFO) value corresponding to the minimum energy as the estimated carrier frequency offset.

According to a preferred embodiment transmission means comprising: means for providing plurality of data subcarriers; means for allocating plurality of null subcarriers based on the carrier assignment scheme (CAS); means for inserting zeros in remaining subcarriers resulting a N-dimensional vector; means for inserting cyclic prefix (CP); means for converting the plurality of transmitted signals from parallel to serial mode; means for synchronizing the plurality of transmitted signals from the plurality of subscriber stations (SS) through a common control signal from a base station; and means for combining the plurality of transmitted signals at the base station.

According to a preferred embodiment processing of signals means comprising: means for converting the plurality of transmitted signals from serial to parallel mode; means for removing cyclic prefix (CP) to generate the N-dimensional received signal vector; means for estimating carrier frequency offset (CFO) for each signal; means for correcting carrier frequency offset (CFO) for each signal and means for transforming the signal into frequency domain by using Fast Fourier transform (FFT) operation.

ADVANTAGES

1. The present scheme can be used with subband and generalized CAS schemes unlike many prevailing art which are CAS specific.
2. The computational complexity and training overhead requirement of the present scheme are very low as compared to many state of the art methods.
3. The method of the present invention does not require channel estimate for the CFO estimation which is a prerequisite for many state-of-art methods.
4. Has reduced the number of computations required for estimation.
5. New interleaved CAS scheme capable of performing better than the conventional interleaved CAS in frequency selective varying channels.
6. Spectral efficiency of the present CFO estimation technique is very high.

Applications:

The present invention can be applied in OEMs of wireless communication systems, digital video broadcasting (DVB) systems, next generation mobile wireless systems like 3GPP-LTE systems, IEEE 802.16m systems, and transceivers for WMAN, WRAN systems etc.

BRIEF DESCRIPTION OF THE ACCOMPANYING DRAWINGS

FIG. 1 illustrates a block diagram of the baseband transmitter of the proposed Null subcarrier based OFDMA system corresponding to the beacon block transmission.

FIG. 2 illustrates a block diagram of a generalized BS receiver of the OFDMA system for the beacon block processing FIG. 3 illustrates a schematic representation of the carrier assignment schemes for which the proposed CFO estimation technique can be applied. The example illustration correspond to four users and each user given with 4 subcarriers FIG. 4 illustrates a flowchart of the method of estimating the CFO from the received combined beacon symbol after RF processing and removal of CP FIG. 5 is graphical illustration of the Normalized Mean Square Estimation Error (NMSE) as a function of SNR with the three CAS schemes FIG. 6 is graphical illustration of the Bit Error Rate (BER) of the receiver when the three CAS schemes are employed and its comparison with the perfect synchronization case FIG. 7 is graphical illustration of the Estimated CFO against actual CFO (Subband CAS)

DETAILED DESCRIPTION OF THE ACCOMPANYING DRAWINGS

Figure 1:
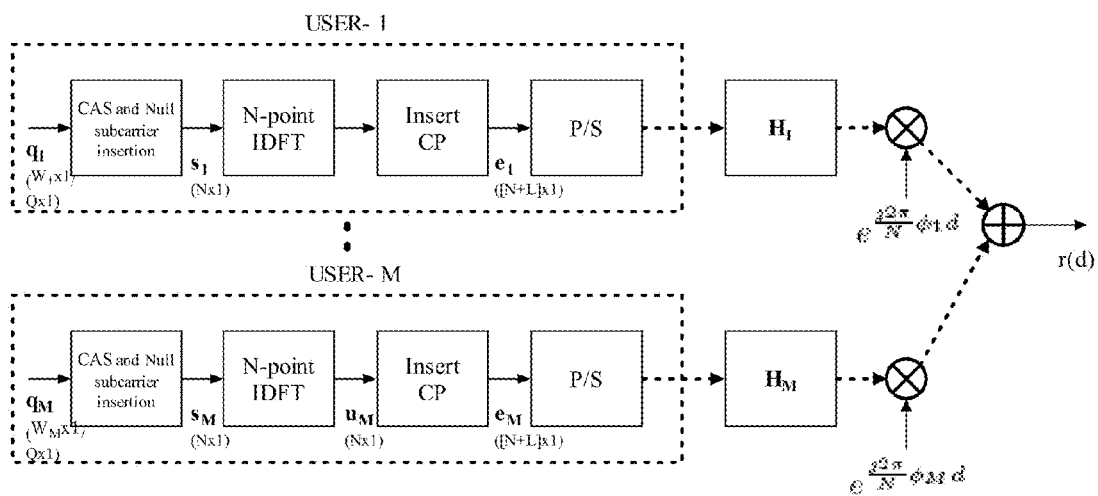
Figure 2:
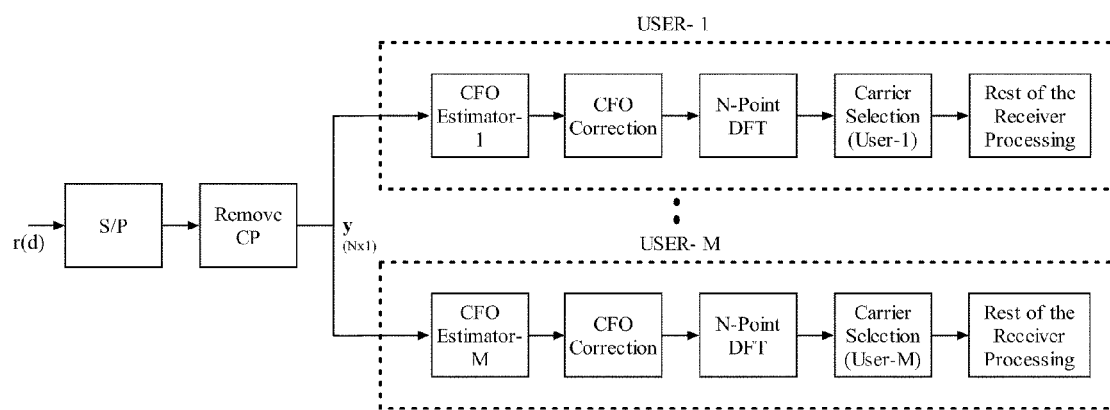
Figure 3:
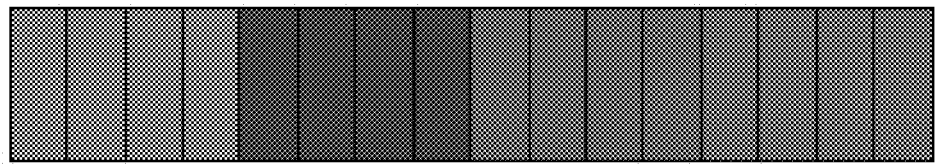
Figure 3:
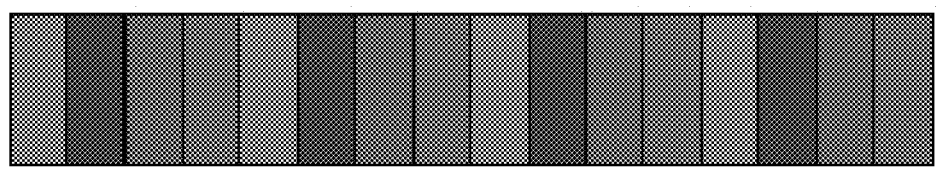
Figure 3:
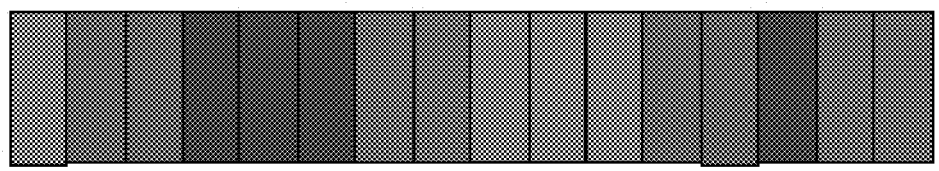
Figure 3:
Figure 3:
Figure 3:
Figure 3:

FIG. 1 represents the block diagram of a generalized OFDMA transmitter corresponding to the transmission of the beacon symbol which consists of a specific sequence of null subcarriers which are allocated based on the CAS used. There are M users and hence M transmitters present in the system. Each transmitter branch receives complex block of data (Wm X1) which is fed to the CAS and null subcarrier insertion unit and mapped over to the Q subcarriers allocated to the m-th user where Q=Wm+Zm where Zm is the number of null subcarriers introduced in the m-th user's beacon symbol for estimating the m-th CFO. Let the set containing the indices of null subcarriers of the m-th user is denoted as $\Gamma_{Zm}$. Zeros are inserted to the remaining subcarriers, which are meant for other users in the system. This results in an N-dimensional vector whose N-point inverse fast Fourier transform (IFFT) is taken to generate the corresponding time domain samples. Each such OFDM symbols are preceded by a CP of length L and transmitted after parallel to serial conversion and RF processing. The transmitted signals from various subscriber stations (SSs), which are synchronized through a common control signal from the BS, will travel through distinct fading channels and experience distinct normalized CFOs, $\phi_1$, $\phi_2, \ldots, \phi_m$ due to the differences in their local oscillator drifts and Doppler spreads. All the transmitted signals will get implicitly combined at the BS and the down converted sampled baseband received signal is denoted as r(d). This part of transmitter is common even in an SC-FDMA system FIG. 2 represents the block diagram of a generalized OFDMA receiver which processes the composite received signal r(d), corresponding to the reception of the beacon symbols which consists of a specific sequence of null subcarriers which are allocated based on the CAS employed at the transmitter. It is converted to a parallel stream of samples and the CP is removed. Then the individual CFOs are estimated and corrected before taking the final DFT. The subcarrier being received from the deferent users are separated at the DFT output according to the CAS rules used and are subjected to the remaining receiver processing. This part of receiver is common even in an SC-FDMA system.

Figure 4:
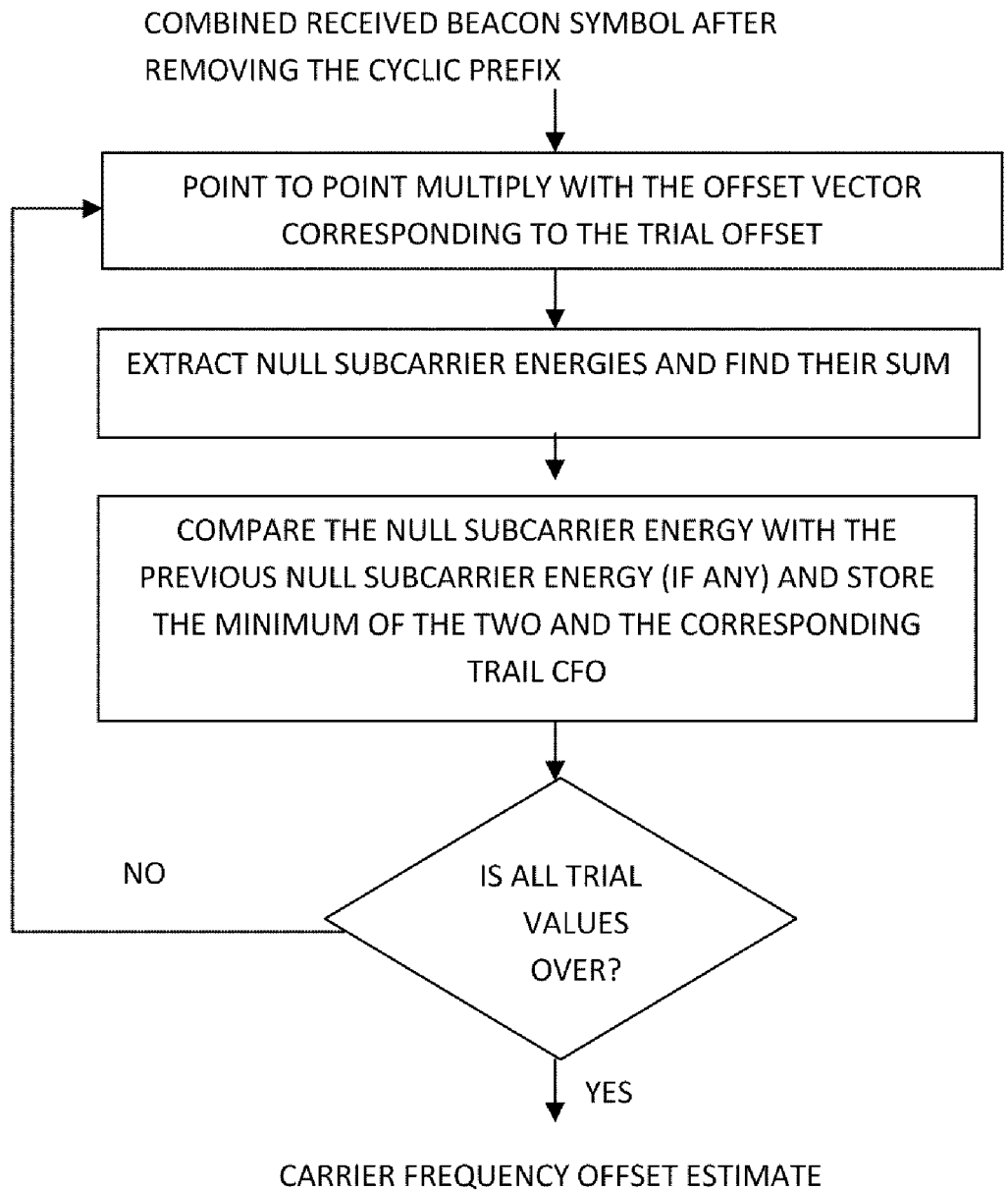

FIG. 4 represents the flowchart of the CFO estimation scheme employed in the uplink for one user corresponding to one receiver branch. For each trial frequency offset from the total number of trial values over the range of +/−0.5, the CFO estimation unit generates a trial CFO vector with the same number of elements as that of the received signal vector (upon removal of CP) and point to point multiply these two vectors. Then total energy of all the signals present in the designated null subcarrier locations are added up and is compared with previous stored energy (if any corresponding to the previous iteration) and store the minimum of the two and the corresponding trial CFO value. This process is repeated until the entire trial values are over and the last value obtained which will be the trial value corresponding to the minimum energy is identified as the estimated carrier frequency offset.

In OFDMA systems, the available N subcarriers are usually evenly divided among the M users, by dividing N into R subchannels, each consisting of Q=N/R subcarriers. As the maximum number of users that an OFDMA system can support is decided by R, it is assumed that M is less than or equal to R. During the uplink transmission M users transmit independently, using the subcarriers allocated to them, by padding zeros in rest of the subcarrier locations.

A preferred embodiment of the invention comprises of a group of OFDMA transmitters (SSs) where each transmitter sends a block of Q data symbols which is fed to the CAS unit and mapped over the Q subcarriers assigned to a particular user. Zeros are inserted to the remaining subcarriers, which are meant for other users in the system. This results in an N-dimensional vector whose N-point inverse fast Fourier transform (IFFT) is taken to generate the corresponding time domain samples. Each such OFDM symbols are preceded by a CP of length L and transmitted after parallel to serial conversion and RF processing. Such K number of OFDM symbols is commonly denoted as an OFDM frame with the first OFDMA symbol in the frame transmitted by each SS is denoted as beacon symbols which are specially generated by imposing a set of specific subcarriers as null subcarriers which are used for the CFO estimation at the BS and the remaining subcarriers in the beacon symbol are used for useful data transmission along with other OFDMA symbols in the frame resulting in enhanced bandwidth efficiency. The transmitted signals from various subscriber stations (SSs), which are synchronized through a common control signal from the BS, will travel through distinct fading channels and experience distinct CFOs due to the differences in their local oscillator drifts and Doppler spreads. All the transmitted signals will get implicitly combined at the BS and the down converted sampled baseband received signal is converted to a parallel stream of samples and the CP is removed by assuming a perfect timing synchronization. Then the individual CFOs are estimated from this combined received signal using separate receive branches equipped with its own CFO estimators and once the CFO is estimated it is corrected at each branches and FFT operation is done to transform the signal back into the frequency domain and the subcarriers meant for each users are selected according to the CAS rules used at the transmitter and it is subjected to rest of receiver processing.

In the preferred embodiment of the invention, the CFOs are estimated by employing a few null subcarriers. A set of Zm subcarriers among the Q subcarriers assigned to the m-th user are imposed as null subcarriers for estimating the m-th CFO. Since no data is transmitter in these subcarriers, ideally zero energy is expected in these subcarrier locations at the BS receiver. But due to the presence of a CFO, the resultant inter carrier interference (ICI) will induce a finite amount of energy in the subcarrier locations. At each of the BS receive branches, separate CFO estimators are used which employ distinct cost function which estimates the sum of the energies present in all the null subcarriers meant for a specific user for a fixed number (Nf) of trial frequency offset values over the range of +/−0.5 subcarrier spacing where the number of such minimization points are decided by the resolution required for the frequency offset estimation, and the CFO of that particular user is estimated as that value of trail frequency offset which results in a minimum cost function magnitude.

Similarly CFOs other (M−1) users of the OFDMA system are estimated by the simultaneous computation of (M−1) cost function minimizations through (M−1) receive branches where each of these receiver branches use the same composite received signal but with cost function magnitude computation done by using the specific set of null subcarriers meant for the remaining (M−1) users in the system. The preferred embodiments of the present invention is known to a person in the skilled in the art.

Generally an SC-FDMA transceiver also have some part of the transmitter block and receiver block common with OFDMA. The proposed CFO estimation method lies in the common part and hence is applicable for SC-FDMA systems also.

The Mathematical Formulation of the CFO Estimation Scheme

In the present invention, the CFOs are estimated by employing a few null subcarriers. A set of $Z_m$ subcarriers among the Q subcarriers assigned to the $m^{th}$ user are imposed as null subcarriers for estimating the $m^{th}$ CFO, $\Phi_m$. Let the set containing the indices of null subcarriers of the $m^{th}$ user is denoted as $F_{zm}$. These null subcarriers need to be introduced only in the first OFDMA block in a frame. Remaining $W_m = Q - Z_m$ subcarriers as well as Q subcarriers in other OFDMA blocks are used for useful data transmission of the $m^{th}$ user, thus resulting in improved bandwidth efficiency. The selection of $W_m$ subcarriers in the first OFDMA block of the $m^{th}$ user, according to the specific CAS rule and null subcarrier allocation pattern, are done with the help of a permutation matrix $V_m$, which is an $N \times W_m$ matrix, whose $(n,j)^{th}$ entry is 1 if the $j^{th}$ data symbol is transferred on the $n^{th}$ subcarrier and zero otherwise.

The N×1 block of frequency domain samples fed to the IDFT modulator can be expressed as $$s_m = V_m q_m \qquad (1)$$

where $q_m$ is the $W_m \times 1$ vector of symbols transmitted on the active subcarriers. For the OFDMA blocks other than the first one, $q_m$ will be a Q×1 vector as all subcarriers are used for data transmission. The transmitted data symbols are assumed to be of zero mean with unit variance and drawn from a finite complex alphabet. The symbol vector $s_m$ is then pre-coded using the IDFT matrix, F, to generate the time domain OFDM symbol, $$u_m = a_m F s_m \qquad (2)$$

where the normalization factor $$\alpha_m = \sqrt{\frac{Q}{W_m}}$$

is applied to ensure a constant transmitted power irrespective of the number of null subcarriers. Then a cyclic prefix is inserted into this sequence to form $e_m$ of size (N+L)×1. As discussed earlier, this OFDMA block is transmitted after RF processing.

At the BS, the M incoming waveforms coming through different multipath channels are implicitly combined by the receiving antenna and are down converted to the baseband. This signal will be corrupted by different timing errors, frequency errors and the multipath fading impairments. Timing offsets can be neglected by assuming a quasi-synchronous scenario where the CP duration is more than the two-way propagation delay and channel impulse response duration (CIR). As the common timing and frequency offsets computed from the downlink signals are used not only to detect the downlink data stream but also used as synchronization references for the uplink transmission, the CFOs normally encountered by the uplink signal will be only the normalized FFO that lies between $105 \leq \phi_m \leq 0.5$. But the FFO experienced by each user in the uplink will be different, thus resulting the CFO estimation as a multiple parameter estimation problem. The received baseband signal samples are given by $$r(d) = \frac{1}{\sqrt{N}} \sum_{m=1}^{M} \sum_{k=0}^{N-1} \overline{H}_m(k) s_m(k) \exp\left(\frac{j2\pi d}{N}[k+\varphi_m]\right) + z(d) \quad (3)$$

with $d = 0, 1, \ldots, L+N-1$

The details of the estimation procedure are described through the following mathematical formulation.

The received time domain signal vector at the BS after the removal of CP samples can be represented as $$y = \sum_{m=1}^{M} \alpha_m P(\varphi_m) H_m F s_m + z$$

where $$P(\varphi_m) = \text{Diag}\left(1, \exp\left(\frac{j2\pi}{N}\varphi_m\right), \ldots, \exp\left(\frac{j2\pi}{N}(N-1)\varphi_m\right)\right)$$

contains the CFO experienced by each sample of the $m^{th}$ user and $H_m$ is the channel matrix between $m^{th}$ SS and BS which is circulant. The noise vector z is assumed to be zero mean circular Gaussian with covariance matrix $\sigma^2 I$. Now by applying diagonalization property of the channel circulant matrix, we can write (4) as $$y = \sum_{m=1}^{M} \alpha_m P(\varphi_m) F D(H_m) s_m + z \quad (5)$$

$D(H_m) = \text{Diag}(H_m(0), H_m(1), \ldots, H_m(N-1))$ contains the frequency domain channel coefficients with $$H_m(k) = \sum_{l=0}^{L-1} h_m(l) \exp\left(-\frac{j2\pi kl}{N}\right)$$

denoting the frequency response of the channel at frequency $$\frac{2\pi k}{N}$$

between $m^{th}$ SS and BS for the $k^{th}$ sub-carrier. The impact of frequency selective channel can be transferred to the respective data symbols contained in it. Thus (5) may be expressed as $$y = \sum_{m=1}^{M} \alpha_m P(\varphi_m) F_{W_m} x_m + z \quad (6)$$

Where $F_{W_m} = F V_m$ is an $N \times W_m$ matrix with $$F_{W_m}(n, k) = \frac{1}{\sqrt{N}} \exp\left(\frac{j2\pi}{N(n-1)k}\right)$$

and $x_m \equiv D(H_{W_m}) q_m$ with $D(H_{W_m})$ representing the $W_m \times W_m$ diagonal matrix containing the actual excited channel coefficients between $m^{th}$ SS and BS corresponding to the Wm data symbols transmitted on the first OFDMA block in a frame.

The covariance matrix of the received signal at the BS can be computed from (6) as $$R_{yy} = \sum_{m=1}^{M} \alpha_m^2 P(\varphi_m) F_{(W_m)} E[x_m x_m^H] F_{(W_m)}^H P^H(\varphi_m) + \sigma^2 I_N \quad (7)$$

Now a cost function for the ML estimation of $\phi_m$ can be constructed, using the covariance matrix of the received signal, as $$J(\varphi'_m) = \sum_{r \in \Gamma_{z_m}} v_{r_m}^H P^H(\varphi'_m) R_{yy} P(\varphi'_m) v_{r_m} \quad (8)$$

Where $\phi'_m$ represents the trial value of CFO for the $m^{th}$ user, $v_{r_m}$ is an N×1 vector given by $$\frac{1}{\sqrt{N}} \left[1, \exp\left(\frac{-j2\pi}{N} r_m\right), \ldots, \exp\left(\frac{-j2\pi}{N(N-1)r_m}\right)\right]^T$$

and $\Gamma_{z_m}$ is the set containing the indices of null subcarriers imposed in the first OFDMA block of $m^{th}$ user. The cost function $J(\phi_m)$ is computed for each trial CFO value in the range of $-0.5 \leq \phi'_m \leq 0.5$ with increments of $1/N_f$ by initializing $P(\phi'_m)$ each time with the corresponding trial value where $N_f$ refers to total number of such trial values. The estimated value of CFO experienced by the $m^{th}$ user is that value of $\phi'_m$ formula which results in the minimum cost function magnitude. Hence the estimated CFO of $m^{th}$ user is given by $$\hat{\varphi}_m \arg \square = \min_{\varphi'_m} J(\varphi'_m) \quad (9)$$

Similarly the CFO experienced by other (M−1) users of the OFDMA system are estimated by simultaneously computing (8) and (9) by using the specific set of null subcarriers $\{\Gamma_{z_m}\}$ for m=1, 2 . . . , M−1. This is possible because the OFDMA block of each user are designed with mutually exclusive set of subcarriers and hence the M null subcarrier sets $\{\Gamma_{z_m}\}$ are also mutually exclusive. Hence at the DFT output where the null subcarrier energies are computed, the M different frequency offsets can be estimated distinctly provided the CFOs lie within half of the subcarrier spacing. If multiple OFDMA blocks having null subcarriers are available for the CFO estimation, the covariance matrix $R_{yy}$ can be averaged over these blocks so as to yield a finer estimate.

Simulation Studies

Performance of the proposed CFO estimator has been studied through computer simulations of an OFDMA uplink. An OFDMA system with 128 subcarriers with a signal bandwidth of 1.25 MHz and sampling frequency of 1.429 MHz is considered. This corresponds to a subcarrier spacing ΔF of 11.16 kHz, which meets one of the specifications of IEEE 802.16e-2005 (amendment to IEEE 802.16-2004) standard for OFDMA uplink.

For higher order OFDMA systems, the DFT size and channel bandwidths are so chosen such that the subcarrier spacing will remain fixed as 11.16 kHz. This justifies the selection of DFT size. The specified DFT size and signal bandwidth corresponds to 112 active subcarriers. Four users are assumed to be present in the system, so that each user will be allocated with 28 subcarriers distributed according to the specific CAS rules.

All simulations are conducted for simultaneous presence of complex AWGN and multipath fading channels. The SUI-5 channel model is considered for the realization of the multipath fading channel. Each OFDM symbol is preceded by a CP of duration 11.2 µs. The channel has a delay spread of 5.2 µs. Hence as long as the two way propagation delay is less than 6 µs timing errors can be incorporated into channel estimation, thus avoids the need for separate timing estimation and correction. Assuming a carrier frequency of 5 GHz and user speed of 50 km/h, the maximum Doppler spread will be 230 Hz. Hence, even though SUI channels are considered, a mobile wireless channel is ensured for the performance studies. The total number of Monte-Carlo trials are fixed as 500.

The null subcarrier assignment in the first OFDMA block of each user for the sub-band CAS scheme is done in an equispaced fashion. For the first user, subcarriers {4, 8, 12, 16, 20, 24} are imposed as null subcarriers. For the modified interleaved CAS, the middle subcarriers of the triplets allocated to a user are imposed as null subcarriers. In the case of a generalized CAS, subcarriers are allocated randomly over the bandwidth. For example, if subcarriers allocated to the first user are {9-11, 16, 27-28, 46-50, 65-71, 86-89, 101-106}, then the subcarriers, {10, 48, 67, 69, 88, 103} may be imposed as null subcarriers. The null subcarrier pattern information can be transmitted to the BS through the uplink control channels. The CFOs of the four users considered for the simulation study are fixed as [0.5, 0.49, −0.48, 0.5]. The CFO values are chosen such that the estimator will be tested under the most adverse frequency offsets and thereby multiple access interferences (MAI). Without loss of generality, we present the result for the first user.

Figure 5:
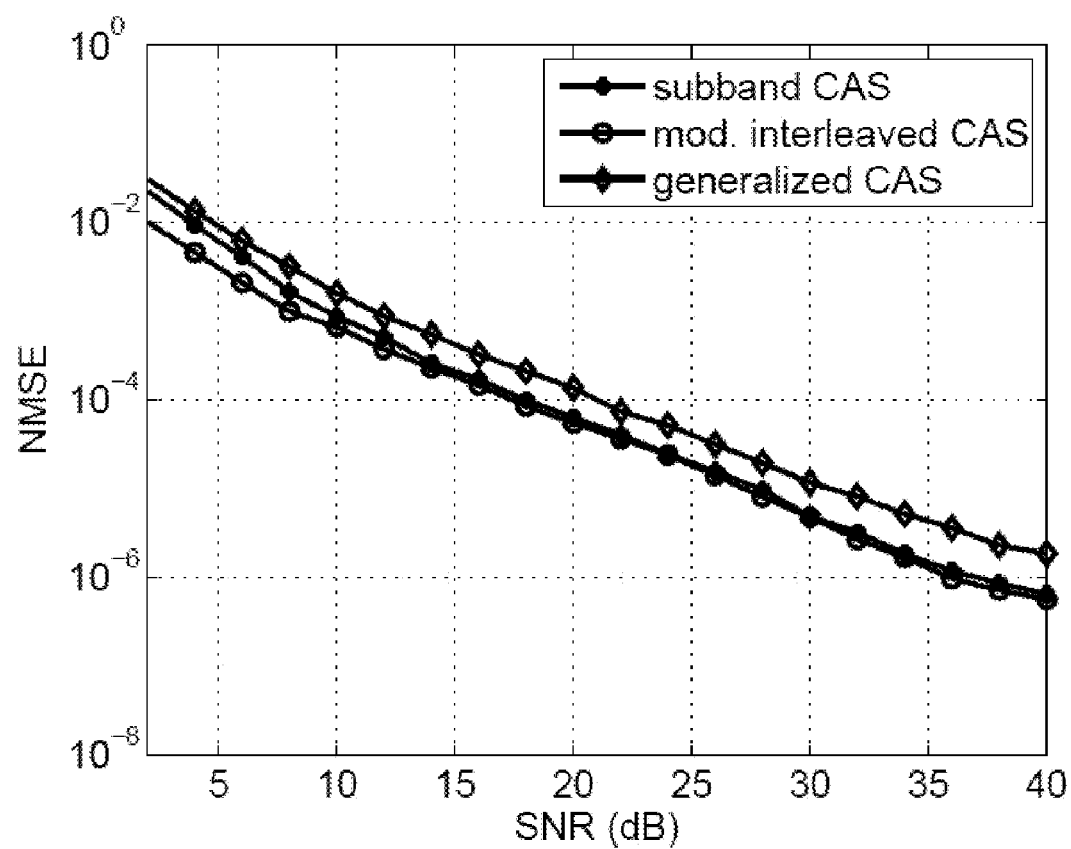

FIG. 5 shows the MSE performance of the proposed method for various CAS schemes. The subband CAS and modified interleaved CAS schemes are shown to yield similar performances, especially from medium to high SNRs. Specifically, they achieve an MSE of $10^{-4}$ at an SNR of 18 dB and it is less than $10^{-5}$ from 27 dB onwards. As subcarriers are allocated randomly, the generalized CAS performs approximately 2 dB inferior to the other schemes. However, as a whole, all the schemes perform within the scope of a practical implementation as the normal requirements of estimation accuracy is approximately 2% of subcarrier spacings, which is typically achievable at medium SNRs.

Figure 6:
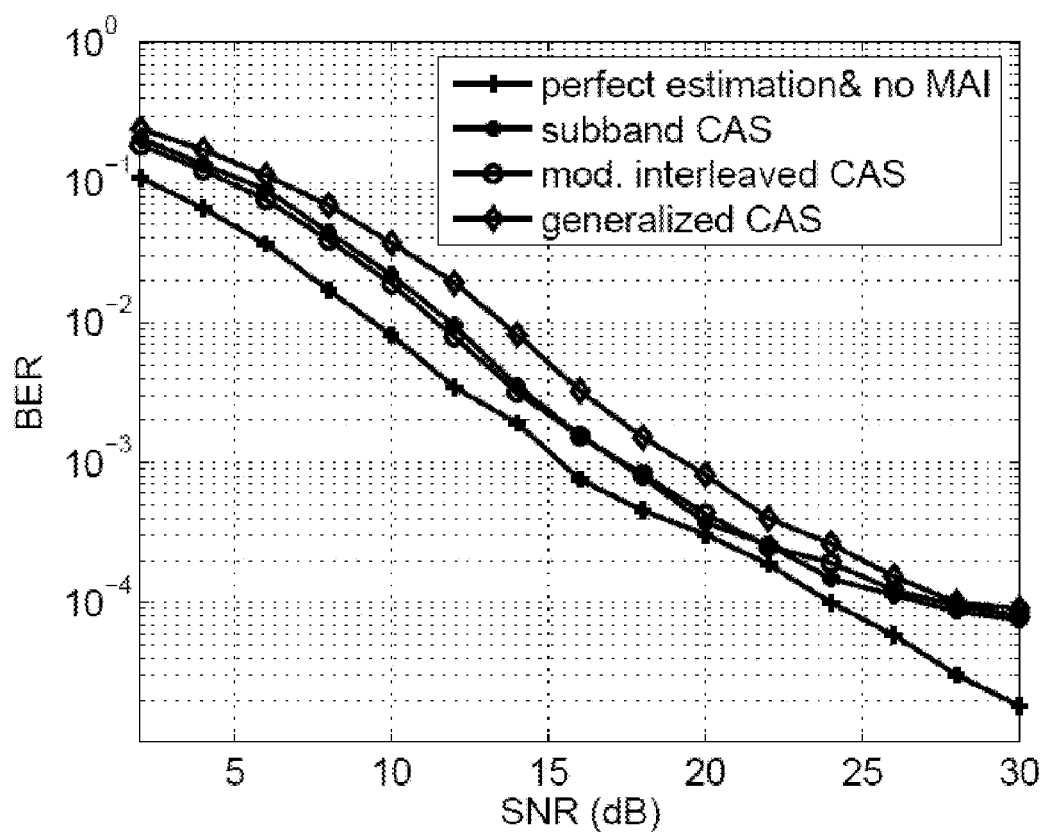

The uncoded BER performance of the OFDMA system for the various CAS schemes are shown in FIG. 6. The modulation scheme used is QPSK with perfect channel estimation and zero forcing equalization. The estimated CFO of the first user is corrected by means of the conventional time domain technique by counter rotating the samples. It can also be corrected by sending the estimated CFO at the BS back to the subscriber stations through the downlink control channel for correcting the local oscillator at the SS. The BER performance can be improved by employing the later technique as it reduces the impact of MAI. Hence the results shown in FIG. 4 represents the worst case BER performances of the OFDMA receiver employing the proposed CFO estimation technique and channel models.

The proposed method achieves a BER of $10^{-3}$ at SNRs of 17 dB and 19 dB, respectively for subband/modified interleaved and generalized CAS schemes. In practice, as the generalized CAS supports dynamic resource allocation where the BS uses the knowledge of users channel responses to assign the best subcarriers that are available at a given time, the performance of it will be better than the other two schemes. However, here a random subcarrier allocation scheme is proposed, to study the bottom line performance. The BER performance of a subband CAS based OFDMA receiver with perfect CFO correction and zero MAI is also shown as a benchmark for comparing the performances of the proposed CFO estimation and correction schemes. It can be seen that SNR penalty of the proposed scheme is only of the order of 2 dB with respect to the perfect system. This is a very appealing feature of the proposed schemes. The BER flattening at high SNRs is due to the impact of small residual ICI being present even after the CFO correction.

Figure 7:
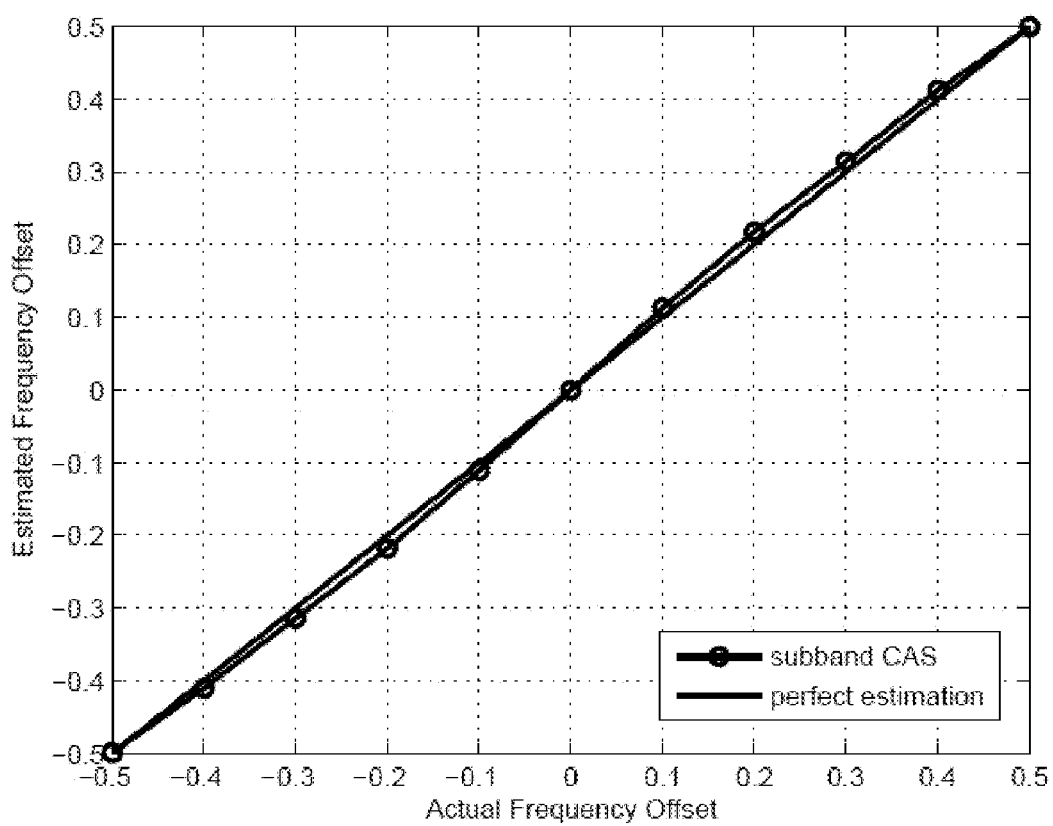
Figure 8:
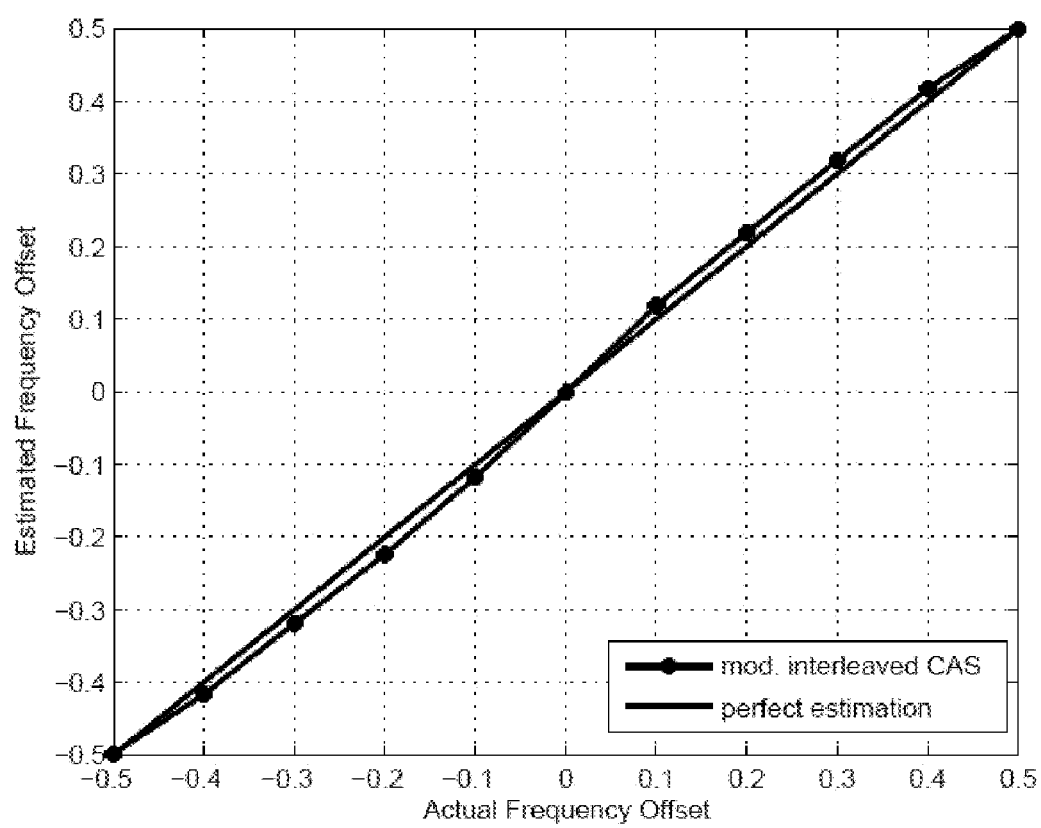
FIG. 8 is graphical illustration of the Estimated CFO against actual CFO (Modified Interleaved CAS)
Figure 9:
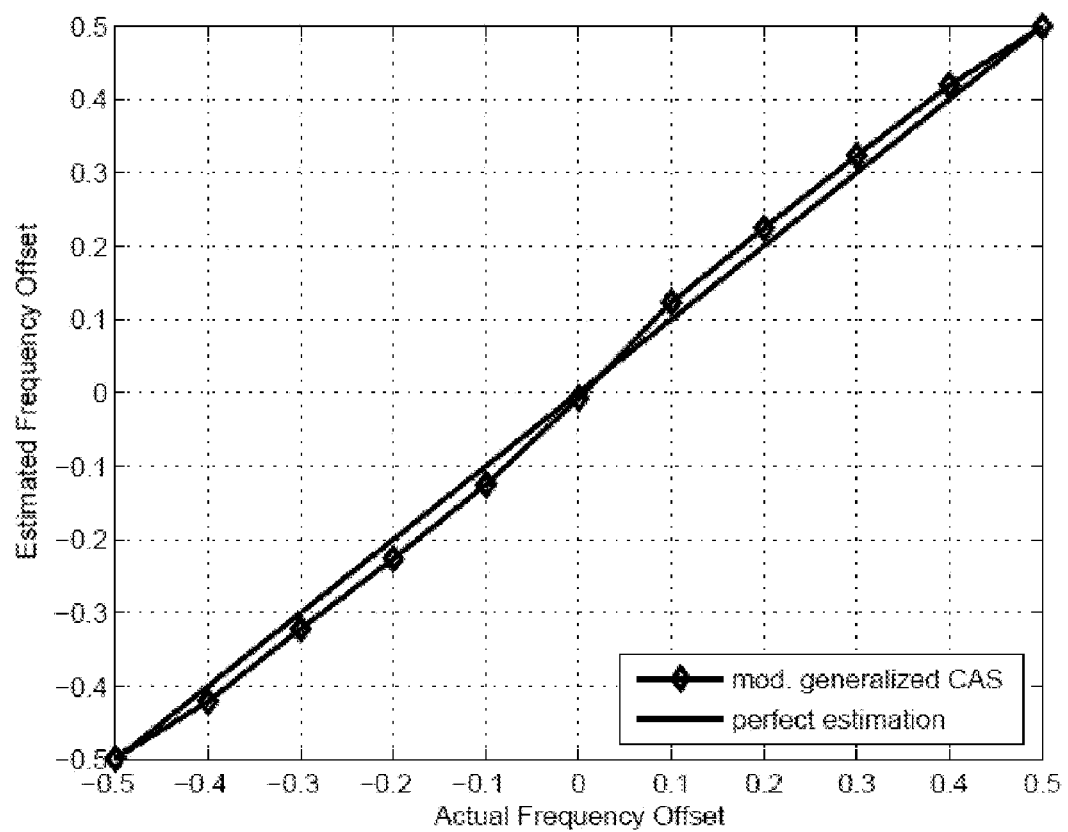
FIG. 9 is graphical illustration of the Estimated CFO against actual CFO (Generalized CAS)

The estimated CFO versus the actual CFO of three CAS schemes are shown in FIGS. 7-9. The CFO estimation performances over the maximum range of ±0.5 subcarrier spacing, with increments of 0.1 subcarrier spacing are studied. All the curves are plotted at a typical SNR of 15 dB. While the subband and interleaved CAS schemes show a close match between the actual and estimated CFOs, the generalized CAS shows a higher difference between the estimated and actual CFOs. However, the difference lies within the synchronization accuracy requirements of a practical implementation. FIGS. 7-9 also shows the identifiability of CFO over the entire range of possible frequency offsets in a typical uplink OFDMA communication system.

The invention claimed is:

1. A low complexity bandwidth efficient method for estimating carrier frequency offset in orthogonal frequency division multiple access (OFDMA) and/or single carrier frequency division multiple access (SC-FDMA) up link transmissions in a communication network system comprising a group of subscriber stations, a base station including carrier frequency offset unit, said method comprising:
   (a) transmitting plurality of null subcarrier signals and data subcarrier signals, said subcarrier signals comprising N-dimensional vector having cyclic prefix, from plurality of said subscriber stations (SS) to the base station;
   (b) processing said transmitted subcarrier signals at the base station by estimating carrier frequency offset (CFO) by means of carrier frequency offset unit;
   (c) selecting the subcarrier signals based on carrier assignment scheme (CAS);
   wherein the estimating carrier frequency offset comprises:
      (i) generating a trial carrier frequency offset (CFO) vector thereafter point to point multiplying the N-dimensional received signal vector after removal of the cyclic prefix with the trial carrier frequency offset (CFO) vector;
      (ii) adding total energies of substantially all signals of designated null subcarrier locations;

(iii) comparing added value of energies as resulted in step (ii) with previously stored null subcarrier energy if any corresponding to previous iteration to obtain a minimum energy;
(iv) storing said minimum energy value and the corresponding trial carrier frequency offset value;
(v) repeating the process until all the trial values are over;
(vi) identifying the trial carrier frequency offset value corresponding to the minimum energy as the estimated carrier frequency offset; and
(vii) performing the steps mentioned in (i)-(vi) simultaneously for all the users in the system.

2. Method as claimed in claim 1, wherein transmitting comprises:
(i) providing plurality of data subcarriers;
(ii) allocating plurality of null subcarriers based on the carrier assignment scheme (CAS);
(iii) inserting zeros in remaining subcarriers resulting a N-dimensional vector;
(iv) inserting cyclic prefix (CP);
(v) converting the plurality of transmitted signals from parallel to serial mode;
(vi) synchronizing the plurality of transmitted signals from the plurality of subscriber stations (SS) through a common control signal from a base station; and
(vii) combined reception of the plurality of transmitted signals at the base station.

3. Method as claimed in claim 1, wherein processing of signals comprises:
(i) converting the plurality of transmitted signals from serial to parallel mode;
(ii) removing cyclic prefix (CP) to generate combined N-dimensional received signal vector;
(iii) estimating carrier frequency offset (CFO) for each signal;
(iv) correcting carrier frequency offset (CFO) for each signal; and
(v) transforming the signal into frequency domain by using fast fourier transform (FFT) operation.

4. A low complexity bandwidth efficient system for estimating carrier frequency offset in orthogonal frequency division multiple access (OFDMA) and/or single carrier frequency division multiple access (SC-FDMA) uplink transmissions in a communication network system comprising a group of subscriber stations, a base station including carrier frequency offset unit, said system comprising:
a) means for transmitting plurality of null subcarrier signals and data subcarrier signals, said subcarrier signals comprising N-dimensional vector having cyclic prefix from plurality of said subscriber stations (SS) to the base station;
b) carrier offset unit configured to estimate carrier frequency offset (CFO) by means of processing said transmitted subcarrier signals at the base station;
c) means for selecting the subcarrier signals based on carrier assignment scheme (CAS);
wherein the carrier offset unit comprises:
i) means for generating a trial carrier frequency offset (CFO) vector thereafter point to point multiplying said trial carrier frequency offset (CFO) vector with the N-dimensional cyclic prefix removed combined received signal;
ii) means for adding total energies of substantially all signals of designated null subcarrier locations;
iii) means for comparing added value of energies as resulted in step (ii) with previously stored null subcarrier energy if any corresponding to previous iteration to obtain a minimum energy;
iv) means for storing said minimum energy value and the corresponding trial carrier frequency offset value;
v) means for repeating the process until all the trial values are over;
vi) means for identifying the trial carrier frequency offset value corresponding to the minimum energy as the estimated carrier frequency offset; and
vii) means for performing the steps mentioned in (i)-(vi) simultaneously for all the users in the system using the specific null subcarriers allocated according to the CAS rule.

5. The system as claimed in claim 4, wherein said transmission means comprises:
(i) means for providing plurality of data subcarriers;
(ii) means for allocating plurality of null subcarriers based on the carrier assignment scheme (CAS);
(iii) means for inserting zeros in remaining subcarriers resulting a N-dimensional vector;
(iv) means for inserting cyclic prefix (CP);
(v) means for converting the plurality of transmitted signals from parallel to serial mode;
(vi) means for synchronizing the plurality of transmitted signals from the plurality of subscriber stations (SS) through a common control signal from a base station; and
(vii) means for the combined reception of the plurality of transmitted signals at the base station.

6. The system as claimed in claim 4, wherein said processing means comprises:
(i) means for converting the plurality of transmitted signals from serial to parallel mode;
(ii) means for removing cyclic prefix (CP) to generate the combined N-dimensional received signal vector;
(iii) means for estimating carrier frequency offset (CFO) for each user;
(iv) means for correcting carrier frequency offset (CFO) for each user and
(v) means for transforming the signal into frequency domain by using fast fourier transform (FFT) operation for each user.

* * * * *